(12) United States Patent
Dornbusch et al.

(10) Patent No.: US 9,238,328 B2
(45) Date of Patent: Jan. 19, 2016

(54) METHOD FOR PRODUCING AN ADHESIVE CONNECTION

(75) Inventors: Michael Dornbusch, Duesseldorf (DE); Hans Detlev Hinz, Schwerte (DE)

(73) Assignee: Ewald Doerken AG, Herdecke (DE)

( * ) Notice: Subject to any disclaimer, the term of this patent is extended or adjusted under 35 U.S.C. 154(b) by 262 days.

(21) Appl. No.: 13/812,528

(22) PCT Filed: Jul. 26, 2011

(86) PCT No.: PCT/EP2011/062790
§ 371 (c)(1),
(2), (4) Date: Feb. 27, 2013

(87) PCT Pub. No.: WO2012/013651
PCT Pub. Date: Feb. 2, 2012

(65) Prior Publication Data
US 2013/0146209 A1 Jun. 13, 2013

(30) Foreign Application Priority Data

Jul. 27, 2010 (DE) .......................... 10 2010 038 470

(51) Int. Cl.
| | | |
|---|---|---|
| *B29C 37/00* | (2006.01) | |
| *B29C 65/08* | (2006.01) | |
| *B29C 65/00* | (2006.01) | |
| *C09J 5/06* | (2006.01) | |
| *B29C 65/48* | (2006.01) | |
| *B29C 65/52* | (2006.01) | |

(52) U.S. Cl.
CPC ............. *B29C 65/08* (2013.01); *B29C 65/4815* (2013.01); *B29C 66/7392* (2013.01); *B29C 66/742* (2013.01); *C09J 5/06* (2013.01); *B29C 65/489* (2013.01); *B29C 65/4875* (2013.01); *B29C 65/522* (2013.01); *B29C 66/74283* (2013.01); *C09J 2205/31* (2013.01); *C09J 2400/163* (2013.01); *C09J 2400/226* (2013.01)

(58) Field of Classification Search
CPC B29C 65/08; B29C 65/4815; B29C 66/7392; B29C 66/742; C09J 5/06
USPC ......... 156/73.1, 278, 283, 284, 325, 326, 327
See application file for complete search history.

(56) References Cited

U.S. PATENT DOCUMENTS

| | | | |
|---|---|---|---|
| 5,868,819 A | 2/1999 | Guhde et al. | |
| 6,645,331 B2 * | 11/2003 | Northey | ........................ 156/73.1 |
| 7,842,146 B2 * | 11/2010 | Siavoshani et al. | .......... 156/73.1 |
| 2008/0193743 A1 | 8/2008 | Kruse et al. | |

FOREIGN PATENT DOCUMENTS

| | | |
|---|---|---|
| DE | 29 44 080 | 5/1980 |
| DE | 4024941 | 2/1992 |
| DE | 102005005480 | 4/2006 |
| DE | 102005056460 | 6/2007 |
| EP | 0495655 | 7/1992 |
| GB | 2121355 | 12/1983 |
| JP | 58028337 | 2/1983 |

OTHER PUBLICATIONS

International search report dated Jan. 12, 2012.

* cited by examiner

*Primary Examiner* — James Sells
(74) *Attorney, Agent, or Firm* — Bachman & LaPointe, PC

(57) ABSTRACT

A method for producing an adhesive connection between a workpiece having a metal surface and a workpiece having a plastic surface with the steps of providing a workpiece having a metal surface that has a coating which includes a thermoplastic, at least at a melt surface; providing a workpiece having a thermoplastic surface; placing the melt surface of the first workpiece having the metal surface and the workpiece having the thermoplastic surface against each other; and welding the workpiece having a metal surface and the non-metallic workpiece having the thermoplastic surface at the melt surface by exposure to ultrasonic.

10 Claims, No Drawings

METHOD FOR PRODUCING AN ADHESIVE CONNECTION

BACKGROUND OF THE INVENTION

The invention relates to a method for producing an adhesive connection between a workpiece having a metal surface and a workpiece having a plastic surface.

Adhesive connections, particularly welded connections are not easy to produce between workpieces composed of different materials. Welding methods were developed for connecting workpieces composed of metal and of plastic, or workpieces having surfaces composed of metal and of plastic, that produce adhesive connections by exposure to ultrasonic. For this purpose, the plastic surface of the workpiece is provided with an overlay composed of metal, at least at the location or area to which the adhesive connection is to be produced (melt surface). This coating composed of metal is made to soften or melt, using ultrasonic waves, as is the surface composed of metal of the workpiece to be connected. The boundary surfaces composed of metal connect together and remain connected together even after cooling. The basis of such methods is disclosed in DE 40 24 941 and DE 10 2005 005 480. GB 2 121 355 A discloses the application of a lacquer at a metal surface, wherein the lacquer is compatible with the plastic. Ultrasonic welding methods are used in industrial, automated production methods.

The application of metal coatings on plastic surfaces is costly. It requires special production steps, particularly the application of coatings or overlays.

SUMMARY OF THE INVENTION

It is the object of the invention to propose a method for producing an adhesive connection between a workpiece having a metal surface, and a workpiece having a plastic surface, that can be produced easily and cost-effectively and which guarantees the corrosion protection of the metallic workpiece.

For solving this object, a method for producing an adhesive connection between workpieces is proposed having the steps providing a workpiece having a metal surface that at a melt surface has a coating comprising a thermoplastic,
providing a workpiece having a thermoplastic surface,
placing the melt surface and the workpiece having the thermoplastic surface against each other,
welding the workpiece having a metal surface and the workpiece having the thermoplastic surface at the melt surface by exposure to ultrasonic.

It has been shown that a connection produced using ultrasonic need not necessarily be based on melting of metals, but can be produced simply and cost-effectively by melting plastic, or respectively synthetic resin, particularly synthetic resin composed of thermoplastic.

Coatings, which comprise a thermoplastic, can be easily applied onto workpieces composed of metal. Workpieces composed of plastic can be made of thermoplastics, comprise the latter, or also be overlayed in a simple manner with such coatings, which comprise thermoplastics or are composed therefrom. Therefore, in the following, workpieces composed of plastic are also designated as workpieces having a thermoplastic surface.

The coating, which comprises a thermoplastic, must be applied at least at the melt surface, thus where the adhesive connection is to be created. However, the entire surface of the workpiece can be overlaid. Because numerous workpieces are provided already with protective overlays composed of synthetic resins or plastics, a coating provided anyway, for example a colored lacquer, can be used here in order to construct an adhesive connection using ultrasonic. The separate application of an overlay only as a melt surface for the welding is then omitted. Thus, in the simplest case, the workpiece having the metal surface is overlaid with a coating that comprises a thermoplastic.

The adhesive connection according to the invention based on thermoplastic coatings melted together is strong enough to satisfy most application cases. Particularly for automotive manufacturing, in which the adhesive connections are subject to very different loading cases, the welded connection proposed here satisfies numerous applications, for example the connection of metal and plastic components of a windshield wiper.

Particularly the metal components must ordinarily be protected against corrosion anyway, and are often provided with colored overlays; thus, they are lacquered. A coating construction according to the invention for a workpiece having a surface composed of metal has a first layer composed of at least one base coat and thereupon a second layer composed of at least one top coat.

A base coast is substantially composed of a binding agent, for example a silane-based binding agent, and metal particles composed for the most part of zinc, aluminum or mixtures or alloys thereof, but can also be composed of other metal particles. A typical composition for a base coat is disclosed in EP 0 808 883. The metal particles form a cathodic corrosion protection. The anti-corrosive base coat is frequently applied in two layers.

The top coat is substantially produced from a binding agent that is possibly colored. Colored pigments, organic and inorganic coloring agents, which are mostly used in mixtures, serve for coloring the binding agent. The top coat serves, along with providing color, mainly for sealing the base coat, which due to the metal particles comprised therein and with the small layer thickness of to some extent only 40 µm to 60 µm, often does not form a completely sealed layer.

The binding agent which is produced for producing the base coat, is for the most part an inorganic binding agent, thus a binding agent without thermoplastics. Typical binding agents are silicates, silanes, silanols, but also titanates and/or siloxanes, in each case alone or in mixtures. However, the binding agent of the base coat can also comprise organic binding agents, for example as co-polymers of inorganic binding agents.

The binding agent that is used for producing the top coat can already comprise thermoplastics. If the binding agent is a binding agent used until now without thermoplastics, for instance, the same binding agent that is comprised in the base coat, then a thermoplastic or a mixture of thermoplastics can be added. However, the top coat can also be applied directly as a thermoplastic layer, for example as a layer composed of coating powder, such as described in WO 2006/007985.

The thermoplastic comprised in the top coat then—although normally already dried or hardened—changes the properties thereof under exposure to ultrasonic waves in the region of the melt surface, thus, softening and possibly melting. The same is true for the thermoplastic that forms the surface of the workpiece composed of plastic, or that is proportionally comprised therein. If the two workpieces in this state, or while exposed to the ultrasonic waves, are pressed against each other at the melt surface, an adhesive connection arises due to the thermoplastics melting or flowing into each other. During cooling, this thermoplastic layer solidifies between the two workpieces to be connected. This connection remains also after cooling. In contrast to welding of metals, welding connections of thermoplastics can be produced at lower temperatures. Not only does this require less energy, it also allows temperature-sensitive workpieces to be welded.

According to an advantageous further development of the invention, the thermoplastic which is comprised in the surface coating of the metal workpiece or in the workpiece having the plastic surface, is resistant to ultraviolet light. Ultraviolet light in the long term leads to brittleness of thermoplastics and thus to a weakening of the adhesive connection. Additives (plasticizers) known per se counteract the brittleness. With this, the adhesive connection according to the invention lasts longer, even if the connected workpieces or components are exposed to daylight.

In the sense of this invention, thermoplastics are plastics which as a coating are already hardened on a workpiece, or of which a workpiece is composed, that can then be melted and cooled again in order to attain an adhesive connection, typically a welded connection. Plastics which satisfy this condition are suitable for implementing the method according to the invention. Preferably a thermoplastic is used for producing the ultrasonic weld connection which is selected from a group comprising: acrylonitrile butadiene styrene (ABS), polyamide (PA), polylactide (PLA), polymethyl methacrylate (PMMA), polycarbonate (PC), polybutylene terephtalate (PBT), polyethylene terephthalate (PET), polyethylene (PE), polypropylene (PP), polystyrol (PS), polyetherketone (PEEK), polyvinyl chloride (PVC), polyacrylate (esters of acrylic acids) and copolymers of acrylates with styrene and other vinyl monomers such as butadiene, maleic acids or itaconic acids. Mixtures of thermoplastics can also be used.

As already described, coatings on workpieces having a metal surface or workpieces having a plastic surface can be composed completely of thermoplastic. This is typically the case when a top coat of powdered lacquer is applied directly onto the workpiece having a metal surface, or respectively onto a base coat, at least in the region of the melt surface, preferably however onto the visible surface or the entire surface of the workpiece.

If however, top coats are used with another binding agent, then the portion of thermoplastic in the coating of the workpiece having a surface composed of metal, or in the workpiece having a plastic surface, preferably amounts to between 5% by weight and 70% by weight of the coating agent. This percentage is sufficient in order to provide a solid and durable adhesive connection. At the same time, this percentage is low enough in order to be integrated into coatings that basically rely on another binding agent such as for example a base coat that is produced with a silane-base binding agent.

Particularly frequently used are coatings with a thermoplastic portion of approximately 30% by weight to 50% by weight.

The method according to the invention can be implemented using a coating with very low layer thicknesses. Even 10 µm layer thickness is sufficient to create a melt surface that is suitable for producing a stable adhesive connection. The layer thickness of the coating at the melt surface can readily also be thicker, for example up to 70 µm thick. This is true particularly if a powered lacquer top coat is used. Thicker layers can also be applied; however then it must be checked whether the coating can still be applied and hardened uniformly.

Preferably for producing a weld connection, a coating between 15 µm and 60 µm, advantageously between 20 µm and 50 µm is applied. The coating is specified here as a thickness of the dry film after hardening of the coating.

The coating agent, from which the hardened coating is produced can be applied in liquid or powder form. Also, multilayer coatings can be applied, with which first a liquid coating agent is applied and hardened, and then a powdered coating agent is applied thereupon and hardened. If the coating agent is applied in liquid form, then water or solvent can be used in order to produce the coating agent. An aqueous coating agent is preferred, because thereby the risk of releasing organic components during the subsequent hardening of the coating is minimized. The coating agent is applied in liquid or powder form at least onto the melt surface. Preferably, the coating is also applied beyond the melt surface and overlays the workpiece, for example as corrosion protection, or as a colored coating.

The subject matter of the invention is further a component made of a workpiece having a metal surface, coated at least in the region of the melt surface with a coating that comprises a thermoplastic, and a workpiece having a plastic surface, which are connected at a melt surface by an adhesive connection by a method, as described above.

The subject matter of the invention is also the use of a coating agent, for instance a top coat having a thermoplastic, for creating melt surfaces on a workpiece having a metal surface.

DETAILED DESCRIPTION

Details of the invention are described in more detail in the following based on exemplary embodiments.

Example 1

An adapter composed of plastic is to be welded onto a carrier composed of sheet steel. The adapter composed of plastic is intended for changing tools. The adapter is produced from polybutylene terephtalate. The end of the adapter to be connected to the carrier has a U-shaped profile that encompasses the carrier. The carrier has a rectangular cross-section. Between the adapter, on the inner surface of the U-shaped profile, and the outside of the carrier, a common contact surface is defined which is the melt surface. This melt surface forms the weld connection to be produced.

According to a first embodiment, a base coat is applied onto the carrier composed of sheet steel, in order to protect the carrier against corrosion. The base coat is composed mainly of a commercially available silane-based binding agent that comprises zinc flake particles, such as disclosed for example in EP 0 808 883.

The base code is applied in two layers, each at 15 µm. The application occurs by immersing the carrier into liquid base coat, centrifuging off the excess and hardening the base coat in a drying oven. This cycle is repeated for each of the two layers of the base coat. This base coat is applied in every case, it is essential for protecting the carrier against corrosion.

A top coat composed of powdered lacquer in which polyamide (PA) mixed with color pigments is applied as a thermoplastic binding agent, is applied onto the base coat in the region of the melt surface according to the first embodiment of the invention, possibly after application of a bonding agent. The application of a powdered lacquer is known per se; the powdered lacquer is applied for instance by means of electrostatic application methods as a thin uniform layer onto the surface of a workpiece composed of sheet steel, heated in an oven until flowing, and subsequently hardened during cooling. The layer thickness of the coating composed of base coat and top coat is 70 µm.

The carrier coated with base coat and top coat according to the first embodiment of the invention, and the adapter are joined in each case in a holding device such that both workpieces abut each other at the melt surface under pressure, but without deformation. Then, an ultrasonic generator known per se acts on the carrier and adapter. The heating of the melt surface, which at the carrier is coated with polyamide and at the adapter is composed of polyamide, lasts for five seconds. Then the melt surfaces, here approximately 5 cm² in total are softened to a depth of 50 μm and flow into each other. The ultrasonic generator is switched off and the carrier and the adapter remain fixed in the holding device for 30 minutes until the softened layer comprising a thermoplastic that flowed into each other has solidified again.

After the thermoplastic has solidified, the carrier and the adapter are firmly connected together. In the region of the melt surface, the top coat, with which the carrier is overlaid, is adhesively connected to the material of the adapter. The top coat remains unchanged outside of the melt surface. In order to produce the ultrasonic weld connection between the carrier and the adapter, for the workpieces to be combined no further measures are necessary other than the already necessary coating of the workpiece composed of metal.

Example 2

A top coat in liquid form is applied onto the previously described carrier which is coated with two layers of the base coat. The top coat has the following composition:

| | |
|---|---|
| Styrene acrylate dispersion | 50% by weight |
| Coloring agent | 10% by weight |
| Polysilicate | 7% by weight |
| Solvent | 5% by weight |
| Stabilizing agent | up to 2% by weight |
| Wetting agent | up to 2% by weight |
| Defoaming agent | up to 2% by weight |
| Lubricant | up to 2% by weight |
| Rheology additives | up to 2% by weight |
| Residual: | water |

This top coat can also be produced without the additives (stabilizing agents, wetting agents, defoaming agent, lubricant, or rheology agent) each added in quantities of up to 2% by weight. However, the storing properties or processing properties can then change, without the top coat being thereby unusable. The same is true for the addition of coloring agents. The top coat comprises polysilicate as an inorganic binding agent.

The top coat is dried and hardened at a temperature of over 30° C. The connection of the carrier and the adapter occurs in the manner described with the preceding Example 1. According to each of the described embodiments of the invention, a solid connection arises between the carrier composed of metal and the adapter composed of plastic.

Also such a top coat can, possibly with the addition of coloring agents or colored pigments, be applied directly, that is without prior coating with a base coat, onto the surface of a workpiece composed of metal.

The invention claimed is:

1. A method for producing an adhesive connection between a workpiece having a metal surface and a workpiece having a plastic surface comprising the steps of:
   providing a workpiece having a metal surface that has a coating, which comprises a thermoplastic, at least at a melt surface, wherein for coating the melt surface, a coating agent as a base coat is applied onto the melt surface and on said base coat a coating agent as a top coat is applied, wherein at least the coating agent for the top coat comprises a thermoplastic, and wherein the base coat comprises metal particles and an inorganic binder,
   providing a workpiece having a thermoplastic surface,
   placing the melt surface of the workpiece having the metal surface and the workpiece having the thermoplastic surface against each other,
   welding the workpiece having a metal surface and the non-metallic workpiece having the thermoplastic surface at the melt surface by exposure to ultrasonic.

2. The method according to claim 1, wherein the thermoplastic is selected from the group consisting of acrylonitrile butadiene styrene (ABS), polyamide (PA), polylactide (PLA), polymethyl methacrylate (PMMA), polycarbonate (PC), polybutylene terephtalate (PBT), polyethylene terephthalate (PET), polyethylene (PE), polypropylene (PP), polystyrol (PS), polyetherketone (PEEK), polyvinyl chloride (PVC), polyacrylate (esters of acrylic acids) and copolymers of acrylates with styrene and other vinyl monomers such as butadiene, maleic acids or itaconic acids, and mixtures of thermoplastic.

3. The method according to claim 1, wherein a coating agent is applied onto the melt surface that comprises between 5% by weight and 70% by weight thermoplastic with respect to the coating agent.

4. The method according to claim 1, wherein the coating is applied onto the workpiece having the metal surface on the melt surface in a layer thickness between 10 μm and 70 μm.

5. The method according to claim 4, wherein the layer thickness is between 15 μm and 60 μm.

6. The method according to claim 4, wherein the layer thickness is between 20 μm and 50 μm.

7. The method according to claim 1, wherein the thermoplastic in the coating is UV resistant.

8. The method according to claim 1, wherein a powdered lacquer, comprising a thermoplastic, is applied at least at the melt surface on the workpiece having a metal surface.

9. The method according to claim 1, wherein an aqueous and/or solvent-containing coating agent, comprising a thermoplastic, is applied at least at the melt surface and subsequently hardened.

10. A component composed of a metal workpiece and a thermoplastic workpiece, produced according to a method according to claim 1.

* * * * *